United States Patent
Ye et al.

(10) Patent No.: US 10,448,049 B2
(45) Date of Patent: Oct. 15, 2019

(54) METHOD FOR COLOR INDEX CODING USING A GENERALIZED COPY PREVIOUS MODE

(71) Applicant: MEDIATEK INC., Hsin-Chu (TW)

(72) Inventors: Jing Ye, San Jose, CA (US); Shan Liu, San Jose, CA (US); Jungsun Kim, San Jose, CA (US); Wang-Lin Lai, San Jose, CA (US); Tzu-Der Chuang, Zhubei (TW); Yu-Chen Sun, Keelung (TW); Xiaozhong Xu, Fremont, CA (US)

(73) Assignee: MEDIATEK INC., Hsin-Chu (TW)

( * ) Notice: Subject to any disclaimer, the term of this patent is extended or adjusted under 35 U.S.C. 154(b) by 167 days.

(21) Appl. No.: 15/505,972

(22) PCT Filed: Sep. 2, 2015

(86) PCT No.: PCT/CN2015/088814
§ 371 (c)(1),
(2) Date: Feb. 23, 2017

(87) PCT Pub. No.: WO2016/034117
PCT Pub. Date: Mar. 10, 2016

(65) Prior Publication Data
US 2017/0289572 A1   Oct. 5, 2017

Related U.S. Application Data

(60) Provisional application No. 62/060,817, filed on Oct. 7, 2014, provisional application No. 62/045,629, filed (Continued)

(51) Int. Cl.
*H04N 19/00* (2014.01)
*H04N 19/593* (2014.01)
(Continued)

(52) U.S. Cl.
CPC .......... *H04N 19/593* (2014.11); *G06F 17/271* (2013.01); *H04N 19/184* (2014.11); *H04N 19/70* (2014.11)

(58) Field of Classification Search
CPC ....... H04N 19/176; H04N 19/50; H04N 19/70
See application file for complete search history.

(56) References Cited

U.S. PATENT DOCUMENTS 6,014,133 A * 1/2000 Yamakado ............ G06F 3/1462
345/501
8,411,942 B2 * 4/2013 Chen ...................... H04N 19/12
382/166

(Continued)

FOREIGN PATENT DOCUMENTS

CN    101682774 A      3/2010
EP    2 129 135 A1    12/2009

OTHER PUBLICATIONS

Pang, C., et al.; "Non-RCE3 2-D MV Supported Intra Motion Compensation;" Joint Collaborative Team on Video Coding (JCT-VC) of ITU-T SG 16 WP 3 and ISO/IEC JTC 1/SC 29/WG 11; Jul.-Aug. 2013; pp. 1-5.

(Continued)

*Primary Examiner* — Gregory M Desire
(74) *Attorney, Agent, or Firm* — McClure, Qualey & Rodack, LLP

(57) ABSTRACT

A method for color index coding of blocks in a picture is disclosed. In one embodiment for the decoder side, a current coding mode is parsed from the input coded bitstream for one or more first currently decoded pixels in a current block starting from a first starting position. If the current coding mode corresponds to a generalized copy-previous-row mode, one or more first reference pixels starting from a first starting reference position located at T-th row above the first currently decoded pixels are identified, where T is an integer (Continued)

equal to or greater than one. The first reference pixels starting from the first starting reference position are then used to decode the first currently decoded pixels starting from a first starting position by copying the first reference pixels starting from the first starting reference position respectively. The system may also include a copy-left mode or escape mode.

26 Claims, 5 Drawing Sheets

Related U.S. Application Data on Sep. 4, 2014, provisional application No. 62/045,085, filed on Sep. 3, 2014.

(51) Int. Cl.
*H04N 19/70* (2014.01)
*H04N 19/184* (2014.01)
*G06F 17/27* (2006.01)

(56) References Cited

U.S. PATENT DOCUMENTS

| | | | |
|---|---|---|---|
| 8,472,522 B2 | 6/2013 | Matsuo et al. | |
| 9,628,795 B2* | 4/2017 | Zhang | H04N 19/176 |
| 9,654,777 B2* | 5/2017 | Guo | H04N 19/50 |
| 9,826,242 B2* | 11/2017 | Pu | H04N 19/186 |
| 2002/0085227 A1 | 7/2002 | Botchkarev | |
| 2007/0116370 A1 | 5/2007 | Smirnov | |
| 2017/0289572 A1* | 10/2017 | Ye | H04N 19/70 |

OTHER PUBLICATIONS

International Search Report dated Nov. 3, 2015, issued in application No. PCT/CN2015/088814.

Guo, et al.: "RCE4: Test 1. Major-color-based screen content coding"; Joint Collaborative Team on Video Coding (JCT-VC) of ITU-T SG 16 WP 3 and ISO/IEC JTC 1/SC 29/WG 11 16th Meeting: San José, US, Jan. 9-17, 2014; pp. 1-12.

Zou, et al.: "Non-SCCE3: Copy from previous row mode for palette coding"; Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014; pp. 1-3.

Ye, et al.: "Non CE6: Copy previous mode"; Joint Collaborative Team on Video Coding (JCT-VC) of ITU-T SG 16 WP 3 and ISO/IEC JTC 1/SC 29/WG 11 19th Meeting: Strasbourg, FR, Oct. 17-24, 2014; pp. 1-7.

Guo, et al.: "RCE4: Results of Test 2 on Palette Mode for Screen Content Coding"; Joint Collaborative Team on Video Coding (JCT-VC) of ITU-T SG 16 WP 3 and ISO/IEC JTC 1/SC 29/WG 11 16th Meeting: San José, US, Jan. 9-17, 2014; pp. 1-3.

Pang, C., et al.; "Non-RCE3: Intra Motion Compensation with 2-D MVs;" Joint Collaborative Team on Video Coding (JCT-VC) of ITU-T SG 16 WP 3 and ISO/IEC JTC 1/SC 29/WG 11; Jul.-Aug. 2013; pps. 1-12.

* cited by examiner

METHOD FOR COLOR INDEX CODING USING A GENERALIZED COPY PREVIOUS MODE

CROSS REFERENCE TO RELATED APPLICATIONS

The present invention claims priority to U.S. Provisional Patent Application, Ser. No. 62/045,085, filed on Sep. 3, 2014, U.S. Provisional Patent Application, Ser. No. 62/045,629, filed on Sep. 4, 2014, and U.S. Provisional Patent Application, Ser. No. 62/060,817, filed on Oct. 7, 2014. The U.S. Provisional Patent Applications are hereby incorporated by reference in their entireties.

TECHNICAL FIELD

The present invention relates to color index coding for video data. In particular, the present invention relates to a generalized copy previous mode that includes the copy-above mode.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. Related key color index coding techniques are briefly reviewed as follows.

Major-Color-Based Screen Content Coding

The major-color-based screen content coding is disclosed in JCTVC-O0108 (Guo, et al., "*RCE4: Test1. Major-color-based screen content coding*", Joint Collaborative Team on Video Coding (JCT-VC) of ITU-T SG 16 WP 3 and ISO/IEC JTC 1/SC 29/WG 11, 16th Meeting: San Jose, Calif., USA, Jan. 9-17, 2014, Document: JCTVC-P0108). Major-color-based screen content coding is performed on a CU basis. The encoding process is as follows:

Selecting Major Colors

A very simple but efficient histogram based algorithm is used to classify the pixels. In specific, the most significant L peak values in the histogram are selected as major colors, and the pixel values that are close to a major color will be quantized to the major color. Other pixels which do not belong to any major color sets are escape pixels, which will also be quantized before coding. For lossless coding, both of the quantization processes are not used. For each pixel, a color index is assigned to indicate which color set it belongs to. The color index may also be referred as an index for convenience when the term will not cause any confusion. If L major colors are used, the values of major colors 0 to (L−1) are signaled for the set of L major colors and the value of major color N is signaled for the escape pixel set.

Encoding the Color Index

After classification, the pixels of a block can be converted into color indices according to the major color set selected. A predictive coding method is applied to the indices, where a pixel line can be predicted by three different modes, including horizontal mode, vertical mode and normal mode.

Horizontal Mode

In horizontal mode, all the pixels in the same line have the same value. If the value is the same as the first pixel of the above pixel line, only line mode signaling bits are transmitted. Otherwise, the index value is also transmitted.

Vertical Mode

In vertical mode, the current pixel line is the same with the above pixel line. Therefore, only line mode signaling bits are transmitted.

Normal Mode

In normal mode, pixels in a line are predicted individually. For each pixel, the left or above neighbor is used as a predictor, and the prediction symbol is transmitted to the decoder.

Palette Mode Coding

A palette-based coding technique is disclosed in JCTVC-P0198 (Guo et. al., "*RCE4: Results of Test 2 on Palette Mode for Screen Content Coding*", Joint Collaborative Team on Video Coding (JCT-VC) of ITU-T SG 16 WP 3 and ISO/IEC JTC 1/SC 29/WG 11, 16th Meeting: San Jose, Calif., USA, Jan. 9-17, 2014, Document: JCTVC-P0198). The palette-based coding is performed on a CU basis. The encoding process is as follows:

Transmission of the Palette:

the palette size is first transmitted followed by the palette elements. The maximum palette size is set to 24.

Transmission of Pixel Values:

the pixels in the CU are encoded in a raster scan order. For each position, a flag is first transmitted to indicate whether the "run mode" or "copy-above mode" is being used.

"Run mode": In "run mode", a palette index is first signaled followed by "palette_run" (e.g., M). No further information needs to be transmitted for the current position and the following M positions as they have the same palette index as signaled. The palette index (e.g., i) is shared by all three color components, which means that the reconstructed pixel values are (Y, U, V)=(paletteY[i], paletteU[i], paletteV[i]) if the color space corresponds to YUV.

"Copy-above mode": In "copy-above mode", a value "copy_run" (e.g., N) is transmitted to indicate that for the following N positions (including the current one), the palette index is equal to the palette index of the one that is at the same location in the row above.

Transmission of Residue:

The palette indices transmitted are converted back to pixel values and used as the prediction. Residue information is transmitted using HEVC residue coding and is added to the prediction for the reconstruction.

Copy from Previous Row Above

Another index coding mode, called "copy from previous row", is disclosed in JCTVC-R0202 (Zou et al., "*Non- SCCE3: *Copy from previous row mode for palette coding*", Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, Document: JCTVC-R0202). This method enables to copy pixels from previously coded rows beyond the row above in the current CU. To achieve a better coding efficiency, all the previous coded rows are available as reference according to JCTVC-R0202. Accordingly, this mode is called "copy from previous row". This mode is added in the available palette mode candidate list. The row index information is coded when the current string chooses "copy from previous row" mode. The row index is coded using truncated binary codeword. Basically, a shorter codeword is designed for the row which is near to the current row. Like with other modes, the matching length is coded in the bitstream.

FIG. 1 illustrates an example of "copy from previous row" for a current CU consisting of 8×8 pixels. The "copy from previous row" is indicated by an arrow pointing from the current starting pixel to the reference starting pixel. The pixels starting from the current starting pixel can be copied from corresponding reference pixels starting from the reference starting pixel. To reduce the encoder complexity, the "copy from previous row" mode is enabled only when the palette size is larger than 2 for the current CU, and "copy from above" is invalid. To reduce the redundancy with "copy from above", the reference rows exclude the above row, and therefore, the "copy from previous row" mode is valid starting from the third row of the current CU.

Index Redundancy Removal

In the color index coding, index redundancy may occur under certain conditions. For example, when the current pixel is predicted by the run-mode and the index value needs to be signaled, it implies that the index of the current pixel (also referred to as the current index) is not the same as the most recent coded previous index in the scanning order. FIG. 2A illustrates a scenario of redundancy in the run-mode, where the line-pattern-filled block indicates a current pixel. The run-mode terminates at the pixel before the current pixel. Since the previous color index is "2", the current index cannot be "2". Otherwise, the current pixel would have been coded by the run-mode along with the preceding pixels. FIG. 2B illustrates a scenario where redundancy may occur in copy-above mode. In this case, the copy-above mode is terminated at the current pixel. If the copy-above mode had continued to include the current pixel, the current pixel index would be the same as the copy-above predictor (i.e., index "4" above the current pixel). Since the copy-above is terminated at the current pixel, the current pixel index cannot be "4". This redundancy can be taken into consideration for coding the current pixel by eliminating the redundant index to reduce the number of indices to be coded by one. The decoder would reconstruct the actual index correctly by take into account of the redundancy.

Entropy Coding for 'Number of Run'

In the current practice, the 'number of run' is binarized and coded as follows:

If 'number of run' is less than 3, it is unary coded with a maximum number of 3 bits and each bin is context based coded.

If 'number of run' is larger than and equal to 3, "111" is context coded and then 'number of run-3' is coded as follows with COEF_REMAIN_BIN_REDUCTION and rParam.

a. When 'number of run-3' is smaller than cMax, the quotient of 'number of run-3' divided by $2^{rParam}$ is unary binarized and the remainder is rParam-bit fixed binarized. Both binarized codes are bypass coded. The parameter cMax determined according to cMax=COEF_REMAIN_BIN_REDUCTION× $2^{rParam}$).

b. When 'number of run-3' is greater than or equal to cMax, if 'number of run-3-cMax' is greater than or equal to $2^{rParam+l}$ and less than $2^{rParam+l+1}$, COEF_REMAIN_BIN_REDUCTION+l is unary binarized and number of run-3-cMax-$2^{rParam+l}$ is (rParam+l)bit fixed binarized.

Both codes are bypass coded.

Table 1 illustrates an example of 'number of run'-3 binarization table for the case of COEF_REMAIN_BIN_REDUCTION=3 and rParam=3, where "x" in the table can be 0 or 1.

TABLE 1

| number of run'-3 | | binarization | |
| --- | --- | --- | --- |
| min_value | max_value | prefix | suffix |
| 0 | 7 | 0 | xxx |
| 8 | 15 | 10 | xxx |
| 16 | 23 | 110 | xxx |
| 24 | 31 | 1110 | xxx |
| 32 | 47 | 11110 | xxxx |
| 48 | 79 | 111110 | xxxxx |
| 80 | 143 | 1111110 | xxxxxx |
| 144 | 271 | 11111110 | xxxxxxx |
| 272 | 527 | 111111110 | xxxxxxxx |
| 528 | 1039 | 1111111110 | xxxxxxxxx |
| 1040 | 2063 | 11111111110 | xxxxxxxxxx |
| 2064 | 4111 | 111111111110 | xxxxxxxxxxx |

It is desirable to improve the coding efficiency associated with color index map coding including various copy modes.

SUMMARY

A method for color index coding of blocks in a picture is disclosed. In one embodiment for the decoder side, a current coding mode is parsed from an input coded bitstream for one or more first currently decoded pixels in a current block starting from a first starting position. If the current coding mode corresponds to a generalized copy-previous-row mode, one or more first reference pixels starting from a first starting reference position located at T-th row above the first currently decoded pixels are identified, where T is an integer equal to or greater than one. The first reference pixels starting from the first starting reference position are then used to decode the first currently decoded pixels starting from the first starting position by copying the first reference pixels starting from the first starting reference position respectively. The system may also include a copy-left mode or escape mode.

The method may further comprises parsing from the input coded bitstream an offset value indicating to a distance between the first starting position and the first starting reference position. The offset value can be binarized using unary codes, where a shortest codeword is assigned to a smallest offset value and a longest codeword is assigned to a largest offset value. The offset value may also be binarized using fixed-length codes. The offset value can be restricted to be equal to or smaller than K, where K is a positive integer larger than two. Furthermore, the offset value can be binarized using truncated binary codes, where a shorter codeword is assigned to a smaller offset value and a longer codeword is assigned to a larger offset value. The offset value may also be binarized using Exponential Golomb codes, Golomb Rice codes, truncated Exponential Golomb codes, truncated Golomb Rice codes, or n-bits truncated unary plus Exponential Golomb codes.

The offset value can be binarized to form a binarized offset value and the binarized offset value is coded using context-based coding or bypass mode. If the offset value is binarized using unary codes, the binarized offset value can be coded using (N+H−1)-bins context-based coding, where N corresponds a first number of reference pixel rows immediately above the current block that are used for predicting the current block, H correspond to block height or block width of the current block. A first part of the binarized offset value can be coded using the context-based coding and a second part of the binarized offset value can be coded using the bypass mode. If the offset value is binarized using fixed-length codes, the binarized offset value can be coded using K-bins context-based coding, where K corresponds to a number of bins of the fixed-length codes. For example, K can be equal to two when a maximum offset value is equal to four.

In one embodiment, N reference pixel rows immediately above the current block are included for predicting the current block. When the first reference pixels involve N unavailable rows of reference pixels immediately above the current block, the N unavailable rows of reference pixels can be set to a pre-defined value. When the first reference pixels involve two unavailable rows of reference pixels immediately above the current block, an offset value indicating to a distance between the first starting position and the first starting reference position will not be signaled for the first starting position in row 0 and row 1 of the current block. If the offset is not signaled, the offset value is inferred to be −2 for row 0 and the offset value is inferred to be −1 for row 1. When the first reference pixels involve two unavailable rows of reference pixels immediately above the current block, a one-bit codeword can be signaled for an offset value indicating to a distance between the first starting position and the first starting reference position. The one-bit codeword can be used to indicate whether the first starting reference position is in a first row immediately above the current block or in a second row at two rows above the current block.

The decode may further parse from the input coded bitstream a first run value indicating to a total number of the first reference pixels. A maximum value for the first run value is fixed by a block size of the current block and the first run value can be binarized depending on the block size of the current block. The first run value can be binarized into a codeword consisting of a prefix part depending on the block size of the current block and a suffix part. For the current block equal to 8×8, ranges of the run value, corresponding prefix part and corresponding suffix part can be (0-7, "0", 3 bits), (8-15, "10", 3 bits), (16-23, "110", 3 bits), (24-31, "1110", 3 bits), (32-47, "11110", 4 bits), and (48-63, "11111", 4 bits). For the current block equal to 16×16, ranges of the run value, corresponding prefix part and corresponding suffix part can be (0-7, "0", 3 bits), (8-15, "10", 3 bits), (16-23, "110", 3 bits), (24-31, "1110", 3 bits), (32-47, "11110", 4 bits), (48-79, "111110", 5 bits), (80-143, "1111110", 6 bits), and (144-255, "1111111", 7 bits).

DETAILED DESCRIPTION

In the present invention, various techniques to improve the performance of color index coding are disclosed. In particular, a generalized "copy from previous row" mode (also referred to as "generalized copy-previous-row mode") is disclosed. According to embodiments of the present invention, N rows indexes above from the CU boundary can be used as the search candidate for "copy from previous row". The color indexes above current CU can be derived from an existing palette, such as current CU palette, shared palette, and single color palette. The index above the current CU can also be derived by padding using these numbers that may help to improve coding efficiency. In this invention, 'previous row' may indicate a previous row or a previous column depending on the scanning order. Also 'row' may indicate a row and a column depending on scanning the order. Furthermore, the methods disclosed in this invention can be applied to the conventional raster scanning orders (horizontal or vertical) or traverse scanning orders (horizontal or vertical).

Generalized "Copy from Previous Row" or "Copy from Above" Mode

Figure 1:
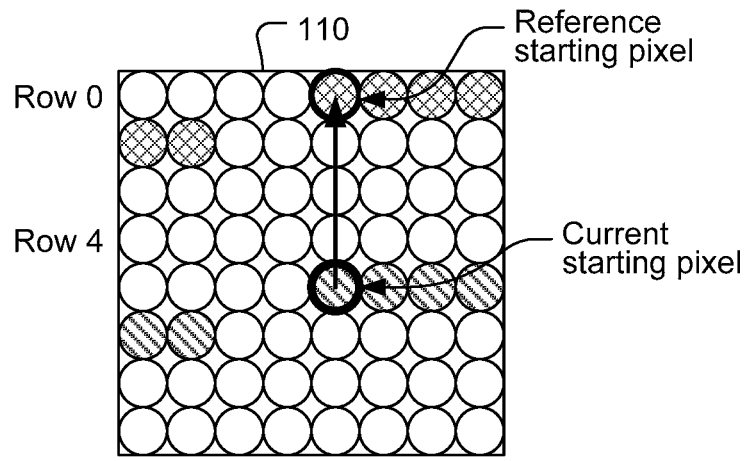
FIG. 1 illustrates an example of "copy from previous row" mode, where the previous row does not include the row immediately above a current pixel.
Figure 2A:
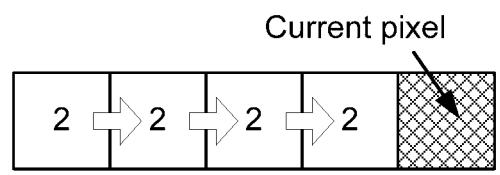
FIG. 2A illustrates a scenario of redundancy associated with the copy-left mode.
Figure 2B:
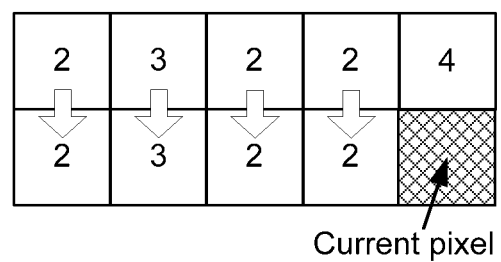
FIG. 2B illustrates a scenario of redundancy associated with the copy-above mode.
Figure 3:
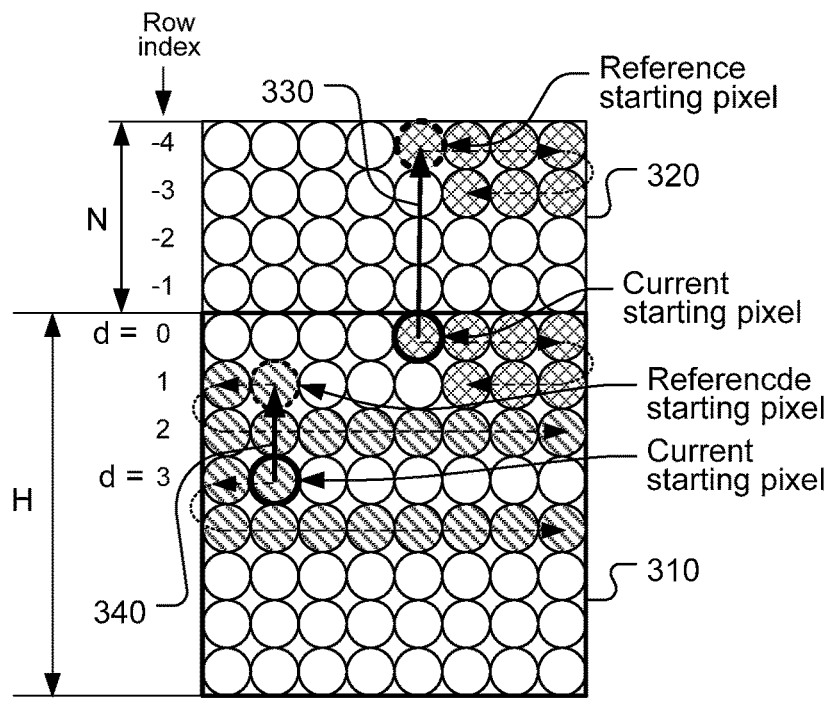
FIG. 3 illustrates an example of "generalized copy from previous row" mode according to an embodiment of the present invention, where the previous row includes the row immediately above a current pixel.

Multiple rows (e.g. N) of indices in an above CU for the case of horizontal index scanning order or a left CU for the case of vertical index scanning order can be used for prediction of the color indices of the current CU. In one embodiment, the index predictor can be from an above LCU for the case of horizontal index scanning order or a left LCU for the case of vertical index scanning order. In another embodiment, any previously coded region in the current picture as well as collocated positions in the previously coded pictures can be used as the index predictor for the current CU. FIG. 3 illustrates an example of using reference pixels in the above CU for the case of horizontal traverse scanning order. For the example in FIG. 3, N is equal to 4. Four rows of reference pixels in the above CU (320) are used by the current CU (310). The first occurrence of generalized "copy from previous row" is in currently coded row index d equal to 0 as indicated by arrow 330 pointing from the current starting pixel to the reference starting pixel. The horizontal traverse scanning order is indicated by the dashed arrow lines. The second occurrence of generalized "copy from previous row" is in currently coded row index d equal to 3 as indicated by arrow 340 pointing from the current starting pixel to the reference starting pixel. Again, the horizontal traverse scanning order is indicated by the dashed arrow lines.

The above CU color indices (i.e., in the case of horizontal scan) or the left CU color indices (i.e., in the case of vertical scan) can be generated by data padding. Any padding data that may help to improve the coding efficiency can be used. For example, index 0 or other index having high probability in index map coding can be used for padding.

The above CU color indices (i.e., in the case of horizontal scan) or the left CU color indices (i.e., in the case of vertical scan) may also be derived based on reconstructed or reconstructed-processed pixels of the above CU (i.e., in the case of horizontal scan) or the left CU (i.e., in the case of vertical scan). The reconstructed-processed pixels can be the reconstructed and deblocking processed pixels, or reconstructed, deblocking processed and SAO (sample adaptive offset) processed pixels.

The encoder/decoder can derive color indices of the above CU (i.e., in the case of horizontal scan) or the left CU (i.e., in the case of vertical scan) using an existing palette, such as the current color table, or shared color table. For example, the current color table can be used to derive the predictor index. When the index is ESCAPE, which indicates that its pixel value is not included in the palette, index 0 or other index can substitute for the ESCAPE index. Any other index that may help to improve the coding efficiency may be used.

After deriving the above CU or left CU color indices, the decoder will apply "copy from previous row" on each row of the index map. In one embodiment, "copy from previous row" can start from the first row of current CU. The encoder/decoder can use the above rows except for the immediate above row to predict the current row. In another embodiment, the encoder/decoder can use all the above rows including the immediate above row to predict the current row. In yet another embodiment, the encoder/decoder can copy multiple above rows except for the immediate above row for some pixel region in the current CU, and can multiple above rows including the immediate above row for other pixel region in the current CU. For example, the encoder/decoder may use the immediate above row to copy from the first row in current CU.

After finding the reference pixels, an offset value will be signaled to indicate which row to copy from. The offset serves as a displacement between the currently coded pixels and the corresponding reference pixels. In FIG. 3, the current pixel as indicated by a thick-lined circle can be predicted from a corresponding reference pixel as indicated by a thick-lined dashed circle. The offset (i.e., arrow 330) for this case is 4 and the offset value of 4 will be signaled for the current starting pixel in the first row of the current CU. Since signaling of the offset will require coded bits, an embodiment according to the present invention imposes a restriction on the maximum number of previous rows that can be copied from. For example, the reference pixel can be limited to previous Krows, such as K=4. The constraint value K can be a predefined value (e.g. 4) or defined in higher level syntax, such as SPS (sequence parameter set), PPS (picture parameter set), and slice header.

For HEVC screen content coding, a new coding mode, named Intra-block copy (IntraBC) has been adopted. According to the IntraBC technique, a current coding unit (CU is predicted by a reference CU in the same picture as the current CU. A block vector (BV) pointing from the current CU to the reference CU is signaled. The IntraBC mode is similar to the Inter mode. The main difference is the reference picture for the IntraBC mode is the picture containing the current CU while the reference picture for the Inter mode is a temporal collocated picture. The BV can point to any block in the reconstruction region of the current picture. Nevertheless, the BV search range is often constrained in order to reduce the complexity or buffer size/bandwidth. In one embodiment of the present invention, the available pixel range for predictors can be the same as the IntraBC constrained search range, or the IntraBC constrained search range+4 above rows. For example, if the IntraBC search range is limited within 4 CTU size, the available pixel range for predictors will be 4 CTUs+4 above rows.

Redundancy removal will be performed to code the offsets. If two consecutive indexes are both "copy from previous row" mode, the second instance cannot copy from the same row. Therefore, coding the second offset of "copy from previous row" may use fewer bits by taking into account of this redundancy. There are many ways to code the offset, such as truncated binary codes, unary codes, truncated unary code, Exponential Golomb code or Golomb Rice code, or truncated Exponential Golomb code or Golomb Rice code, n-bits of TU (truncated unary) code+ Exponential Golomb code, or fixed-length code.

Color Index Coding Modes

The "copy from previous row" mode can be used with other color index coding modes as disclosed below.

A. "Copy Left", "Copy Above" and "Copy from Previous Row"

In this embodiment, the "copy from previous row" mode as mentioned above can be added as an additional mode to the copy-above and copy-left modes to encode index map. Additional syntax element is signaled to indicate the usage of the "copy from previous row" mode. If the "copy from previous row" mode is used, then a syntax element indicating the offset (e.g., previous_row_offset) will be parsed. If the parsed syntax element corresponds to a value n, the current pixel could find the corresponding reference pixel from the row located at n rows above. There are many ways to signal the color index mode. Table 2 illustrates an example of codeword design for the three color index coding modes.

TABLE 2

| Codeword | Mode |
| --- | --- |
| 0 | Copy-left or Escape |
| 10 | Copy-above |
| 11 | Copy from previous row |

B. "Copy Left" and "Copy Above"

In this embodiment, the Copy-above mode can be included in the "copy from previous row" mode. The offset is a positive integer number starting from one. In other words, the offset between the current starting position and the reference starting position can be equal to 1, i.e., the case for conventional copy-above mode. When the offset is 2 or larger, it corresponds to the conventional "copy from previous row" mode. The offset can be coded by exponential Golomb codes or its truncated variants. Table 3 illustrates an example of codeword design for the two color index coding modes.

TABLE 3

| Codeword | Mode |
| --- | --- |
| 0 | Copy-left or Escape |
| 1 | Copy-above, up to N rows |

The above examples in Tables 2 and 3 are for illustration purpose. Various codes mentioned above, such as truncated binary codes, unary codes, truncated unary code, Golomb Rice code, etc. can also be used to practice the present invention.

Offset Coding in "Copy Above" or "Copy from Previous Row"

As mentioned before, the offset between currently coded pixels and corresponding reference pixels has to be signaled. Table 4 and Table 5 illustrate two examples of code design for offset with offset starting at 2 and 1 respectively. The parameters N and d are shown in FIG. 3. The current row index is d, and the number of rows in the above CU is N, where N is equal to 4 in this example. In one example, there is no restriction on the number of above rows. In another example, the number of above rows is capped by the height of above CU. In this case, the copy-above or "copy from previous row" cannot go beyond the above CU. In yet another example, the maximum number of above rows for "copy above" or "copy from previous row" is pre-defined in a higher level syntax, such as SPS (sequence parameter set), PPS (picture parameter set), or slice header.

TABLE 4

| Code word | offset |
|---|---|
| 0 | −2 |
| 10 | −3 |
| 110 | −4 |
| 1110 | −5 |
| ... | ... |
| 1 ... 0 | −(N + d − 1) |

TABLE 5

| Code word | offset |
|---|---|
| 0 | −1 |
| 10 | −2 |
| 110 | −3 |
| 1110 | −4 |
| ... | ... |
| 1 ... 0 | −(N + d) |

Table 6 and Table 7 illustrate two examples of offset coding using fixed length codes with offset starting at 2 and 1 respectively. The parameters N and d are shown in FIG. 3. The current row number is d, and the number of rows in the above CU is N, where N is equal to 4 in this example. The restricted number of above rows is P and P is equal to 4 in this case.

TABLE 6

| Code word | offset |
|---|---|
| 00 | −2 |
| 10 | −3 |
| 11 | −4 |
| 01 | −5 |

TABLE 7

| Code word | offset |
|---|---|
| 00 | −1 |
| 10 | −2 |
| 11 | −3 |
| 01 | −4 |

Table 8 and Table 9 illustrate examples of offset coding using truncated binary codeword with offset starting at 2 and 1 respectively. Again, the parameters N and d are shown in FIG. 3. The current row index is d, and the number of rows in the above CU is N, where N is equal to 4 in this example. The restricted number of above rows is P and P is equal to 5 in this case.

TABLE 8

| Code word | offset |
|---|---|
| 00 | −2 |
| 01 | −3 |
| 10 | −4 |
| 110 | −5 |
| 111 | −6 |

TABLE 9

| Code word | offset |
|---|---|
| 00 | −1 |
| 01 | −2 |
| 10 | −3 |
| 110 | −4 |
| 111 | −5 |

The above examples of offset coding are for illustration purpose. Various codes mentioned above, such as exponential Golomb coded or Golomb Rice codes, truncated exponential Golomb coded or Golomb Rice codes, or n-bits of TU (truncated unary)+Exponential Golomb can be used for coding the offset.

The offset coding may also use multiple context models to code. The offset may also use bypass mode to code. According to FIG. 3, there can be up to N+H−1 bins when unary coding is used for the offset, where H is the CU height or width. When fixed length codes are used for the offset, there can be up to C bins, where C is equal to 2 in Table 5 above. When other code words are used for offset coding, there can be up to n bins. Table 10 illustrates examples of different numbers of context model used.

TABLE 10

| Different types | Context model |
|---|---|
| 1 | All context model(N + H − 1, n, or C) |
| 2 | 1 context model for the first bin, and the rest bins are bypass mode |
| 3 | 2 context model for the first two bins, and the rest bins are bypass mode |
| 4 | 3 context model for the first three bins, and the rest are bypass mode |
| 5 | 4 context model for the first four bins, and the rest are bypass mode |
| 6 | All bypass(N + H − 1, n, or C) |

After the offset is signaled, the length of run will be signaled. For the example in FIG. 3, to code the first instance of "copy from previous row", a run of 7, including the current starting pixel, will be signaled for the currently coded pixels in row 0.

Copy from Previous N Row Mode when Neighboring Pixels Unavailable

N (N≥1) rows of indices in the above CU in the case of horizontal scanning order or the left CU in the case of vertical scanning order can be used for predicting the indices of the current CU. In one embodiment, the predictor indices can be from above LCU in the case of horizontal scanning order or left LCU in the case of vertical scanning order. In general, any previously coded regions in the current picture and collocated positions in the previously coded pictures can be used for predicting the indices of the current CU.

When the current block is at the boundaries of picture, slice or tiles, or when intra_constraint_flag is true and the block contains referred pixel is Inter predicted, the pixels used in prediction of the indices of the current CU may be unavailable. One aspect of the present invention addresses the issue of unavailable neighboring pixels.

Setting Neighboring Indices as Pre-Defined Value

When predictors corresponding to N (N≥1) rows of indices in the above CU in the case of horizontal scanning order or the left CU in the case of vertical scanning order are not available, a pre-defined value such as 0 or other value that may help to improve the coding efficiency may be used. For example, the value with high probability in index map coding can be used.

There are two variances for "Copy previous N rows" when N is equal to 2, where N is the number of rows in the above CU in the case of horizontal scanning order or the left CU in the case of vertical scanning order.

Case 1: No Offset Signaling for Row 0 and Row 1.

When "Copy previous mode" is used in row 0 and row 1, the encoder and decoder do not need to signal the offset. If the "copy previous mode" is used for row 0, it indicates that the predictor is from row −2. If the "copy previous mode" is used for row 1, it indicates that the predictor is from row−1.

Case 2: Offset Signaling for Row 1.

When "copy previous mode" is used in row 1, the encoder and decoder will signal the offset for row 1 to indicate whether the prediction is from row −1 or row −2. A 1-bin code can be used to signal the row number. The signal can use context model or bypass mode. Table 11 illustrates an example of 1-bin coding for the row index.

TABLE 11

| Reference row number | Code word |
| --- | --- |
| −1 | 0 |
| −2 | 1 |

Preventing Referring Above Pixels

When predictors corresponding to N (N≥1) rows of indices in the above CU in the case of horizontal scanning order or the left CU in the case of vertical scanning order are not available, reference to the predictors corresponding to N rows of indices in the above CU or the left CU can be disallowed. Therefore, index prediction mode for the pixels in the first row in the case of N=1 or the pixels before the second row in the case of N>1 can be the run mode without signaling its index prediction mode.

Index Redundancy Removal

Index redundancy removal can be applied when current pixel is located after first row in the case of N=1 or the pixels after the second row in the case of N>1 since decoder may not have the actual indices of predictors in the case that the predictor is in another CU at the parsing stage. After decoder determines the actual indices of predictors, the actual indices of the current index map are calculated by referring to the already reconstructed indices.

Copy Previous XY Mode

Figure 4:
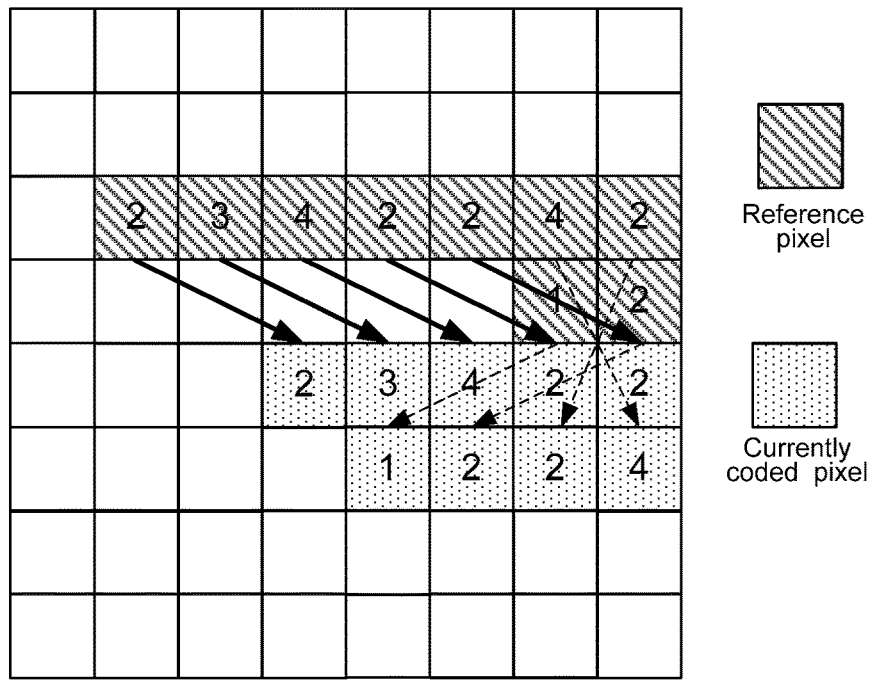
FIG. 4 illustrates an example of "copy previous XY mode" according to an embodiment of the present invention.

As shown in FIG. 4, the current pixel can be predicted from Y-above 'rows' and X-previous 'columns', where (Y>0) and (−M<X<N) and M and N are positive integers. In FIG. 4, it is assumed to use horizontal scanning order. If a vertical scanning order is used, the "rows" become "columns" and the "columns" become "rows".

After signaling the prediction mode, Y and X (i.e., y-offset and x-offset) are signaled by comparing to neighboring pixels' y-offset and/or x-offset.

Escape Color with Prediction Mode

As mentioned before, the palette index map coding has several prediction modes, including copy-above mode and copy-left mode (also called run-mode). In these modes, the color indices are copy from the predictors, i.e., the above sample or the left sample. In SCM-2.0 (Screen Content Coding Test Model 2.0), the run-based like palette coding method is incorporated. In SCM-2.0, the copy-above mode and run-mode are used. The escape sample is coded with the color index equal to the max palette size in run-mode. In run-mode, if the coded palette size is equal to the maximum palette size in run-mode, the values of each component (e.g. RGB component or YUV component) are signaled.

In JCTVC-R0202, index prediction from previous multiple rows is disclosed. The encoder will signal Δrow to indicate that the current index is predicted from the previous row with distance Δrow.

However, in JCTVC-R0202, if the copy-above mode is used and the above sample is coded in escape index, the escape values are not signaled. The decoder cannot know the reconstruct values of this sample. To solve this problem, some solutions according to the present invention are disclosed below.

Direct Copy Predefined Index if the Predictor of Predictor Copy Mode is Escape Sample In predictor copy mode, a value "copy_run" is transmitted or derived to indicate that for the following N positions (including the current one), the color indices are equal to color indices in the corresponding copy mode position (e.g. from above, left, top-left, above M line, top-right, etc.). However, if the predictor is escape sample, the current sample copies a predefined index (e.g. 0). In other word, the predictor is treated as a predefined index (e.g. 0). If the index is coded by index run and the referenced index (i.e., adjustedRefIndex) is from above index, adjustedRefIndex is also treated as the predefined index (e.g. 0).

For "copy previous mode", a value Δrow and a value "copy_previous_run" (e.g. N, the N can be inferred as 0) is transmitted or derived to indicate that for the following N positions (including the current one), the color indices are equal to color indices in the previous row with distance Δrow. However, if the predictor (i.e., the index in the previous row with distance Δrow) is escape sample, the current sample copies a predefined index (e.g. 0). In other words, the predictor is treated as a predefined index (e.g. 0). If the index is coded by index run and the referenced index (i.e., adjusted RefIndex) is from the index in the previous row with distance Δrow, adjusted RefIndex is also treated as the predefined index (e.g. 0).

In SCM-2.0 (Joshi, et al., "Screen content coding test model 2 (SCM 2)", Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, Document: JCTVC-R1014), for the context modeling of palette prediction mode, the context formation depends on whether the above pixel is coded as copy_above or not. For example, the context index, ctxIdx is determined according to:

ctxIdx=(above_prediction_mode==copy_above)?1:0;

In one embodiment of the present invention, when the above pixel is escape pixel and copy-above mode is selected, the prediction mode of current pixel can be set to copy_above or copy_above_esc. In context formation, copy_above_esc can be treated as copy_above. For example, the context index, ctxIdx is determined according to:

ctxIdx=(above_prediction_mode==copy_above
    ‖above_prediction_mode==copy_above_esc)?1:0;

Direct Copy the Reconstructed Value in Predictor Copy Mode if the Predictor is Escape Sample For the copy mode, a value "copy_run" is transmitted or derived to indicate that for the following N positions (including the current one), the color indices are equal to corresponding color indices in the copy mode position (e.g. from above, left, top-left, above M line, top-right, etc.). However, if the predictor is escape sample, the current sample not only copies the index (i.e., the escape index) but also copies the reconstruction value (e.g. the escape value) from the predictor. No escape code (e.g. coding the escape value) is required in this copy reconstructed mode.

In "copy previous mode" as disclosed in JCTVC-R0202, a value Δrow and a value "copy_previous_run" (e.g. N) is transmitted or derived to indicate that for the following N positions (including the current one), the color indices are equal to color indices in the previous row with distance Δrow. However, if the predictor is escape sample, the current sample not only copies the index (the escape index) but also copies the reconstruction value (e.g. the escape value) from the predictor. No escape code (e.g. coding the escape value) is required in this copy reconstructed mode. For example, if the predictor is inside the current CU, the current sample copies the escape value from the predictor. If the predictor is outside the current CU, the current sample copies the reconstruction value from the predictor.

In SCM-2.0, for the context modeling of palette prediction mode, the context formation depends on whether the above pixel is coded as copy_above or not. For example, the context index, ctxIdx is determined according to:

ctxIdx=(above_prediction_mode==copy_above)?1:0;

In the proposed method, when the above pixel is escape pixel and copy-above mode is selected, the prediction mode of current pixel can be set to copy_above or copy_above_esc. In context formation, copy_above_esc can be treated as copy_above. For example, the context index, ctxIdx is determined according to:

ctxIdx=(above_prediction_mode==copy_above‖above_prediction_mode==copy_above_esc)?1:0;

Unification of "Escape Color with Prediction Mode" and "Prediction for Color Index Map Coding from NPs"

The method "Escape color with prediction mode" and the method "Prediction for color index map coding from NPs (neighboring pixels)" can be unified. In the method of "Prediction for color index map coding from NPs", the decoder can directly infer NPs' indices into the escape index. Therefore, if pixels in the first row are signaled as copy-above mode, the pixel will be predicted from the escape index. To deal with prediction from an escape index, the method of "Direct copy the reconstructed value in predictor copy mode if the predictor is escape sample" can be used. A NP's index is directly inferred as an escape index. In other words, if the pixel is predicted for NPs (copy-above mode or copy previous mode), the decoder will copy pixel values of NPs. The reconstructed index of the pixels predicted is inferred as escape index. Note that NPs can be multiple rows outside the current CU. NPs can be M rows outside the current CU, where M may depend on color format or buffer size of deblocking filter. For example, the M for luma can be 4 and the M for chroma can be 2.

Figure 5:
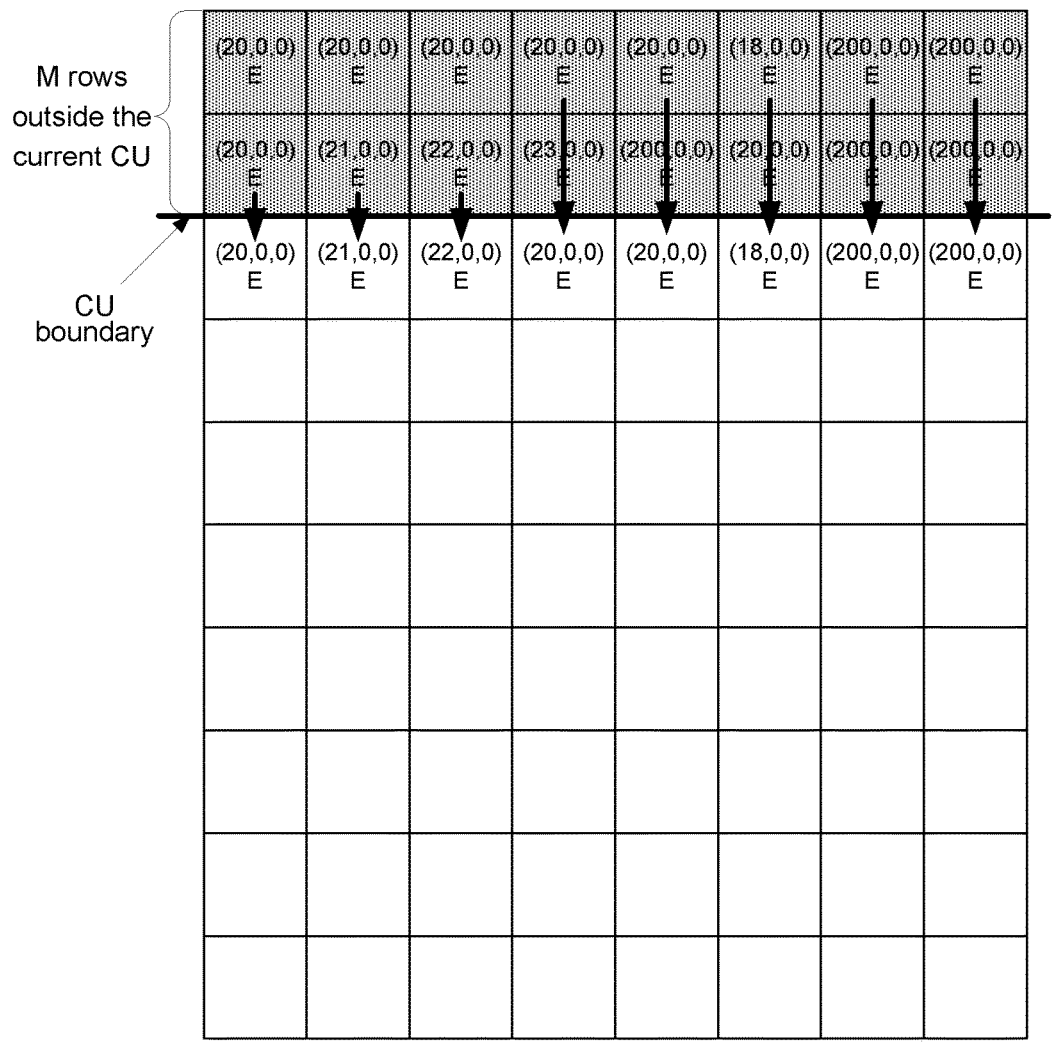
FIG. 5 illustrates an example of unified "escape color with prediction mode" and "prediction for color index map coding from neighboring pixels (NPs) having M rows of reconstructed neighboring pixels outside the current CU. The decoder can directly infer indices of NPs as the escape index.

FIG. 5 shows an example. NPs can be M rows outside the current CU. In FIG. 5, M is equal to 2. The index inside CU can be predicted from NPs by cop-above mode or copy-previous mode as described in JCTVC-R1005. NPs' indices are directly inferred as an escape index. If the pixel is predicted for NPs using either copy-above mode or copy-previous mode, the decoder will copy pixel values of NPs. The reconstructed index of the pixels is also copied from NPs' indices (i.e., inferred as escape index).

Another aspect of the present invention addresses binarization of palette run. Several embodiments of the present invention are disclosed to improve the coding efficiency related to the binarization of palette run disclosed as follows.

Different Binarization Tables for 'Number of Run' of 'New Run Mode' and 'Copy-Above Mode'

Since 'number of run' of 'new run-mode' and 'number of run' of 'copy-above mode' show different distribution, two different binarization tables can be used for each case. The two different binarization tables may share the same contexts for the most important bins.

For example, for 'new run mode', the shorter runs are predominant as compared to longer runs, especially for runs equal to 0 and 1. Therefore, the binarization can be designed with greater unevenness of codeword lengths so that very short codeword lengths are assigned to very short runs. Also, the binarization of runs for the 'new run-mode' starts increasing the codeword lengths earlier than for the binarization of runs for the 'copy-above mode'.

Modification of Binarization Table by the Block Size

Reduction of Bit Length for 'Number of Run' Smaller than a Threshold.

It has been observed that 'number of run' shows steeper curve than Gaussian distribution or Laplacian distribution. Most of 'number of run' are concentrated in very small numbers such as 0, 1, and 2. If most of 'number of run' are assumed to concentrate in range [0, . . . , N], shorter codeword length can be used for 'number of run' smaller than N and longer codeword length can be used for other 'number of run'. N can be decided according to the block size such as block-width or 2*block-width. N can be fixed as 8, 16, 32 or 64. N also can be different for 'new run-mode' and 'copy-above mode'.

Reduction of Maximum Bit Length.

Maximum 'number of run' is fixed by the block size. For example, if the block size is 8×8, 'number of run' cannot be larger than 64 and if the block size is 64×64, 'number of run' cannot be larger than 4096.

The prefix of each value can be binarized as truncated unary binarization with maximum size related to the current block size. To further improve the coding efficiency, the last suffix of a block can have 4-bit fixed length or more. Table 12a through Table 12g illustrate examples of the binarization for 8×8 through 64×64 blocks according to an embodiment of the present invention. The prefixes and the suffixes in the tables can be different according to the parameters COEF_REMAIN_BIN_REDUCTION and rParam.

TABLE 12a

8 × 8 block.

| value | | binarization | |
|---|---|---|---|
| min_value | max_value | prefix | suffix |
| 0 | 7 | 0 | xxx |
| 8 | 15 | 10 | xxx |
| 16 | 23 | 110 | xxx |

TABLE 12a-continued

8 × 8 block.

| value | | binarization | |
|---|---|---|---|
| min_value | max_value | prefix | suffix |
| 24 | 31 | 1110 | xxx |
| 32 | 47 | 11110 | xxxx |
| 48 | 63 | 11111 | xxxx |

TABLE 12b

16 × 16 block.

| Value | | binarization | |
|---|---|---|---|
| min_value | max_value | prefix | suffix |
| 0 | 7 | 0 | xxx |
| 8 | 15 | 10 | xxx |
| 16 | 23 | 110 | xxx |
| 24 | 31 | 1110 | xxx |
| 32 | 47 | 11110 | xxxx |
| 48 | 79 | 111110 | xxxxx |
| 80 | 143 | 1111110 | xxxxxx |
| 144 | 255 | 1111111 | xxxxxxx |

TABLE 12c

16 × 16 block.

| Value | | binarization | |
|---|---|---|---|
| min_value | max_value | prefix | suffix |
| 0 | 7 | 0 | xxx |
| 8 | 15 | 10 | xxx |
| 16 | 23 | 110 | xxx |
| 24 | 31 | 1110 | xxx |
| 32 | 63 | 11110 | xxxxx |
| 64 | 127 | 111110 | xxxxxx |
| 128 | 255 | 111111 | xxxxxxx |

TABLE 12d

32 × 32 block.

| value | | binarization | |
|---|---|---|---|
| min_value | max_value | prefix | suffix |
| 0 | 7 | 0 | xxx |
| 8 | 15 | 10 | xxx |
| 16 | 23 | 110 | xxx |
| 24 | 31 | 1110 | xxx |
| 32 | 47 | 11110 | xxxx |
| 48 | 79 | 111110 | xxxxx |
| 80 | 143 | 1111110 | xxxxxx |
| 144 | 271 | 11111110 | xxxxxxx |
| 272 | 527 | 111111110 | xxxxxxxx |
| 528 | 1023 | 111111111 | xxxxxxxxx |

TABLE 12e

32 × 32 block.

| value | | binarization | |
|---|---|---|---|
| min_value | max_value | prefix | suffix |
| 0 | 7 | 0 | xxx |
| 8 | 15 | 10 | xxx |
| 16 | 23 | 110 | xxx |
| 24 | 31 | 1110 | xxx |
| 32 | 63 | 11110 | xxxxx |
| 64 | 127 | 111110 | xxxxxx |
| 128 | 255 | 1111110 | xxxxxxx |
| 256 | 511 | 11111110 | xxxxxxxx |
| 512 | 1023 | 11111111 | xxxxxxxxx |

TABLE 12f

64 × 64 block.

| value | | binarization | |
|---|---|---|---|
| min_value | max_value | prefix | suffix |
| 0 | 7 | 0 | xxx |
| 8 | 15 | 10 | xxx |
| 16 | 23 | 110 | xxx |
| 24 | 31 | 1110 | xxx |
| 32 | 47 | 11110 | xxxx |
| 48 | 79 | 111110 | xxxxx |
| 80 | 143 | 1111110 | xxxxxx |
| 144 | 271 | 11111110 | xxxxxxx |
| 272 | 527 | 111111110 | xxxxxxxx |
| 528 | 1039 | 1111111110 | xxxxxxxxx |
| 1040 | 2063 | 11111111110 | xxxxxxxxxx |
| 2064 | 4095 | 11111111111 | xxxxxxxxxxx |

TABLE 12g

64 × 64 block.

| value | | binarization | |
|---|---|---|---|
| min_value | max_value | prefix | suffix |
| 0 | 7 | 0 | xxx |
| 8 | 15 | 10 | xxx |
| 16 | 23 | 110 | xxx |
| 24 | 31 | 1110 | xxx |
| 32 | 63 | 11110 | xxxxx |
| 64 | 127 | 111110 | xxxxxx |
| 128 | 255 | 1111110 | xxxxxxx |
| 256 | 511 | 11111110 | xxxxxxxx |
| 512 | 1023 | 111111110 | xxxxxxxxx |
| 1024 | 2047 | 1111111110 | xxxxxxxxxx |
| 2048 | 4095 | 1111111111 | xxxxxxxxxxx |

This method can be applied to any other binarization of values when prefix is unary binarized and suffix is fixed length binarized.

In another embodiment, the binarization tables for block size 8×8, 16×16, 32×32 and 64×64 are shown in Table 13a to Table 13g.

TABLE 13a

8 × 8 block.

| value | | binarization | |
|---|---|---|---|
| min_value | max_value | prefix | suffix |
| 0 | 0 | 0 | |
| 1 | 8 | 10 | xxx |

TABLE 13a-continued

8 × 8block.

| value | | binarization | |
|---|---|---|---|
| min_value | max_value | prefix | suffix |
| 9 | 16 | 110 | xxx |
| 17 | 24 | 1110 | xxx |
| 25 | 32 | 11110 | xxx |
| 33 | 48 | 111110 | xxxx |
| 49 | 63 | 111111 | xxxx |

TABLE 13b

16 × 16block.

| value | | binarization | |
|---|---|---|---|
| min_value | max_value | prefix | suffix |
| 0 | | 0 | |
| 1 | 8 | 10 | xxx |
| 9 | 16 | 110 | xxx |
| 17 | 24 | 1110 | xxx |
| 25 | 32 | 11110 | xxx |
| 33 | 48 | 111110 | xxxx |
| 49 | 80 | 1111110 | xxxxx |
| 81 | 144 | 11111110 | xxxxxx |
| 145 | 255 | 11111111 | xxxxxxx |

TABLE 13c

16 × 16block.

| value | | binarization | |
|---|---|---|---|
| min_value | max_value | prefix | suffix |
| 0 | | 0 | |
| 1 | 8 | 10 | xxx |
| 9 | 16 | 110 | xxx |
| 17 | 24 | 1110 | xxx |
| 25 | 32 | 11110 | xxx |
| 33 | 63 | 111110 | xxxxx |
| 65 | 127 | 1111110 | xxxxxx |
| 129 | 255 | 1111111 | xxxxxxx |

TABLE 13d

32 × 32 block.

| value | | binarization | |
|---|---|---|---|
| min_value | max_value | prefix | suffix |
| 0 | | 0 | |
| 1 | 8 | 10 | xxx |
| 9 | 16 | 110 | xxx |
| 17 | 24 | 1110 | xxx |
| 25 | 32 | 11110 | xxx |
| 33 | 48 | 111110 | xxxx |
| 49 | 80 | 1111110 | xxxxx |
| 81 | 144 | 11111110 | xxxxxx |
| 145 | 272 | 111111110 | xxxxxxx |
| 273 | 528 | 1111111110 | xxxxxxxx |
| 529 | 1023 | 1111111111 | xxxxxxxxx |

TABLE 13e

32 × 32block.

| value | | binarization | |
|---|---|---|---|
| min_value | max_value | prefix | suffix |
| 0 | | 0 | |
| 1 | 8 | 10 | xxx |
| 9 | 16 | 110 | xxx |
| 17 | 24 | 1110 | xxx |
| 25 | 32 | 11110 | xxx |
| 33 | 64 | 111110 | xxxxx |
| 65 | 128 | 1111110 | xxxxxx |
| 129 | 256 | 11111110 | xxxxxxx |
| 257 | 512 | 111111110 | xxxxxxxx |
| 513 | 1023 | 111111111 | xxxxxxxxx |

TABLE 13f

64 × 64block.

| value | | binarization | |
|---|---|---|---|
| min_value | max_value | prefix | suffix |
| 0 | | 0 | |
| 1 | 8 | 10 | xxx |
| 9 | 16 | 110 | xxx |
| 17 | 24 | 1110 | xxx |
| 25 | 32 | 11110 | xxx |
| 33 | 48 | 111110 | xxxx |
| 49 | 80 | 1111110 | xxxxx |
| 81 | 144 | 11111110 | xxxxxx |
| 145 | 272 | 111111110 | xxxxxxx |
| 273 | 528 | 1111111110 | xxxxxxxx |
| 529 | 1040 | 11111111110 | xxxxxxxxx |
| 1041 | 2064 | 111111111110 | xxxxxxxxxx |
| 2065 | 4095 | 111111111111 | xxxxxxxxxxx |

TABLE 13g

64 × 64block.

| value | | binarization | |
|---|---|---|---|
| min_value | max_value | prefix | suffix |
| 0 | | 0 | |
| 1 | 8 | 10 | xxx |
| 9 | 16 | 110 | xxx |
| 17 | 24 | 1110 | xxx |
| 25 | 32 | 11110 | xxx |
| 33 | 64 | 111110 | xxxxx |
| 65 | 128 | 1111110 | xxxxxx |
| 129 | 256 | 11111110 | xxxxxxx |
| 257 | 512 | 111111110 | xxxxxxxx |
| 513 | 1024 | 1111111110 | xxxxxxxxx |
| 1025 | 2048 | 11111111110 | xxxxxxxxxx |
| 2049 | 4095 | 11111111111 | xxxxxxxxxxx |

In another embodiment, the binarization tables for block size 8×8, 16×16, 32×32 and 64×64 are in Table 14a to Table 14g.

TABLE 14a

8 × 8 block.

| min_value | max_value | binarization |
|---|---|---|
| 0 | | 0 |
| 1 | | 10 |
| 2 | 3 | 110x |
| 4 | 7 | 1110xx |
| 8 | 15 | 11110xxx |
| 16 | 31 | 111110xxxx |
| 32 | 63 | 111111xxxxx |

TABLE 14b

16 × 16 block.

| min_value | max_value | binarization |
|---|---|---|
| 0 | | 0 |
| 1 | | 10 |
| 2 | 3 | 110x |
| 4 | 7 | 1110xx |
| 8 | 15 | 11110xxx |
| 16 | 31 | 111110xxxx |
| 32 | 63 | 1111110xxxxx |
| 64 | 127 | 11111110xxxxxx |
| 128 | 255 | 11111111xxxxxxx |

TABLE 14c

16 × 16 block.

| min_value | max_value | binarization |
|---|---|---|
| 0 | | 0 |
| 1 | | 10 |
| 2 | 3 | 110x |
| 4 | 7 | 1110xx |
| 8 | 15 | 11110xxx |
| 16 | 31 | 111110xxxx |
| 32 | 159 | 1111110xxxxxxx |
| 160 | 287 | 1111111xxxxxxx |

TABLE 14d

32 × 32 block.

| min_value | max_value | binarization |
|---|---|---|
| 0 | | 0 |
| 1 | | 10 |
| 2 | 3 | 110x |
| 4 | 7 | 1110xx |
| 8 | 15 | 11110xxx |
| 16 | 31 | 111110xxxx |
| 32 | 63 | 1111110xxxxx |
| 64 | 127 | 11111110xxxxxx |
| 128 | 255 | 111111110xxxxxxx |
| 256 | 511 | 1111111110xxxxxxxx |
| 512 | 1023 | 1111111111xxxxxxxxx |

TABLE 14e

32 × 32 block.

| min_value | max_value | binarization |
|---|---|---|
| 0 | | 0 |
| 1 | | 10 |
| 2 | 3 | 110x |
| 4 | 7 | 1110xx |
| 8 | 15 | 11110xxx |
| 16 | 31 | 111110xxxx |
| 32 | 63 | 1111110xxxxx |
| 64 | 191 | 11111110xxxxxxx |
| 192 | 703 | 111111110xxxxxxxxx |
| 704 | 1215 | 111111111xxxxxxxxx |

TABLE 14f

64 × 64 block.

| min_value | max_value | binarization |
|---|---|---|
| 0 | | 0 |
| 1 | | 10 |
| 2 | 3 | 110x |
| 4 | 7 | 1110xx |
| 8 | 15 | 11110xxx |
| 16 | 31 | 111110xxxx |
| 32 | 63 | 1111110xxxxx |
| 64 | 127 | 11111110xxxxxx |
| 128 | 255 | 111111110xxxxxxx |
| 256 | 511 | 1111111110xxxxxxxx |
| 512 | 1023 | 11111111110xxxxxxxxx |
| 1024 | 2047 | 111111111110xxxxxxxxxx |
| 2048 | 4095 | 111111111111xxxxxxxxxxx |

TABLE 14g

64 × 64 block.

| min_value | max_value | binarization |
|---|---|---|
| 0 | | 0 |
| 1 | | 10 |
| 2 | 3 | 110x |
| 4 | 7 | 1110xx |
| 8 | 15 | 11110xxx |
| 16 | 31 | 111110xxxx |
| 32 | 63 | 1111110xxxxx |
| 64 | 127 | 11111110xxxxxx |
| 128 | 255 | 111111110xxxxxxx |
| 256 | 767 | 1111111110xxxxxxxx |
| 758 | 2815 | 11111111110xxxxxxxxxx |
| 2816 | 4863 | 11111111111xxxxxxxxxxx |

In some embodiments of the present invention, the codeword length of a longer run can be shorter than the codeword length of a shorter run. Fixed length binarized parts of each codeword also can be binarized with truncated binarization.

Signaling Start Position of Each Prediction Set

Figure 6:
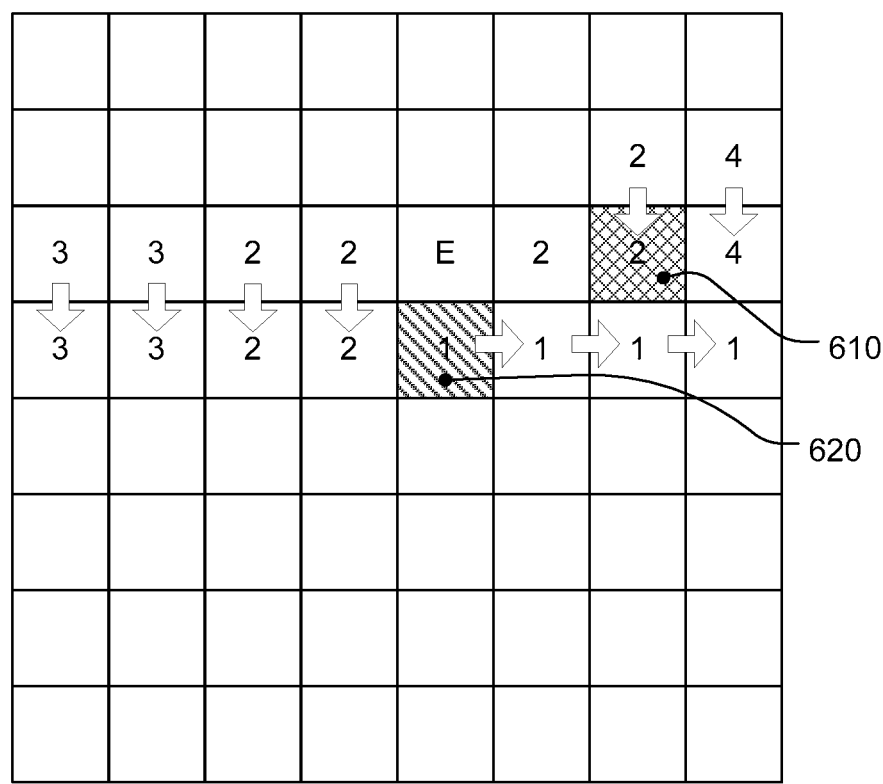
FIG. 6 illustrates an example of color index map with two starting positions associated with a copy-above mode and a copy-left mode respectively. The two starting positions are coded.

The start location of each set can be explicitly signaled without signaling 'number of run' itself. FIG. 6 illustrates an example that 'copy-above mode' is applied to a first starting position (610) and the following 5 pixels. Then, 'new run-mode' is applied to second starting position (620) and the following 3 pixels. For the first starting position (610), a first one flag to indicate 'copy-above mode' is signaled followed by 'number of run' equal to 5 since (run-1) is signaled. A second flag to indicate 'new run-mode' is signaled followed by 'number of run' equal to 4. An embodiment of the present invention signals the positions of each start point directly. The present invention is not restricted to any specific binarization method or entropy coding method for the run numbers.

Signaling of Absolute Location.

The location in term of x-y coordinate for each position is signaled. For example, the first starting position (610) in FIG. 6, an absolution location (6, 2) can be signaled and the second starting position (610) in FIG. 6, an absolution location (4, 3) can be signaled.

Signaling of Relative Location.

The relative location of N-th start point to [N−1]-th start point can be signaled. In FIG. 6, the first starting position is (6, 2) and that of second starting position is (4, 3). Accordingly, the relative location of second start point with respect to the first one is (−2, 1). Accordingly, (−2, 1) is signaled for the second set.

Signaling of Location.

The relative location can be signaled in one direction and the absolute location can be signaled in the other direction. For example, the absolute location can be signaled in the x-direction and the relative location can be signaled for the y-direction. Accordingly, for the second starting position in FIG. 6, "4" is signaled for the x-direction and "1" is signaled for the y-direction.

The performance of a coding system incorporating an embodiment of the present invention is compared to that for an anchor system. The anchor system corresponds to the system based on SCM-2.0, where separate copy-above and copy-previous modes are used. The embodiment of the present invention uses generalize copy-previous mode where the copy-previous mode include the reference pixels in the row immediately above the currently coded pixel. The comparisons are performed under various coding configurations including All Intra (AI), Random Access (RA) and Low-delay B frame (LB). The embodiment of the present invention results in lower BD-rates (i.e., negative values) compared to the anchor system. The BD-rate is a well-known performance measure in the field of video coding. For the All Intra configuration, the best improvement in BD-rate is as high as 3.6%; and for the Low-delay B frame configuration, the best improvement in BD-rate is as high as 3.5%.

Figure 7:
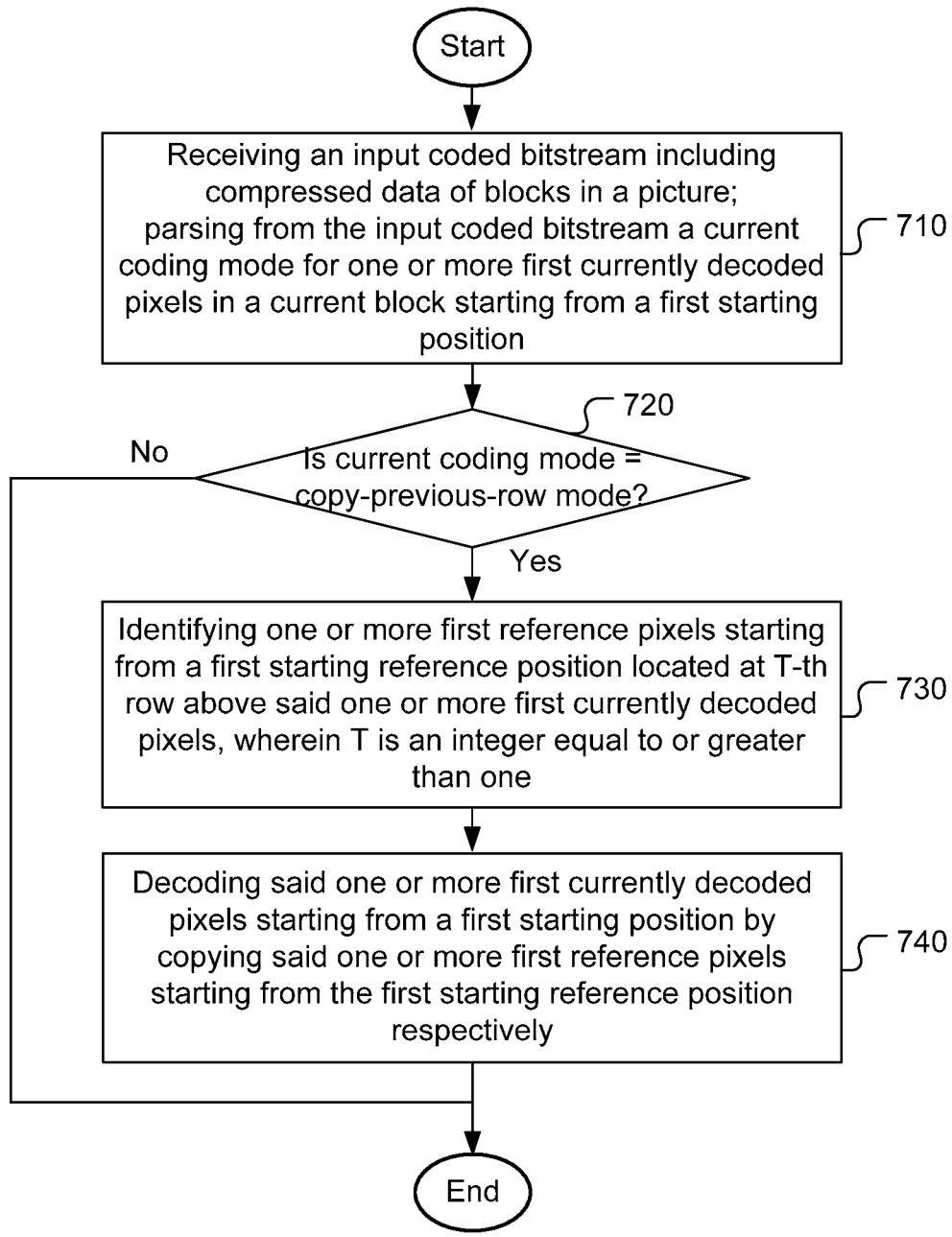
FIG. 7 illustrates an exemplary flowchart of a decoder system for color index coding using a generalized copy previous row mode and copy-above mode according to an embodiment of the present invention.

FIG. 7 illustrates an exemplary flowchart of a decoding system for color index coding using a generalized copy-previous mode according to an embodiment of the present invention. The system receives an input coded bitstream including compressed data of blocks in a picture and parses a current coding mode for one or more first currently decoded pixels from the input coded bitstream as shown in step 710. The input coded bitstream may be retrieved from memory (e.g., computer memory, buffer (RAM or DRAM) or other media) or from a processor. Whether the current coding mode is a generalized copy-previous-row mode is checked in step 720. If the current coding mode is a generalized copy-previous-row mode (i.e., the "Yes" path), steps 730 and 740 are performed. If the current coding mode is not a generalized copy-previous-row mode (i.e., the "No" path), steps 730 and 740 are skipped. In step 730, one or more first reference pixels starting from a first starting reference position located at T-th row above the first currently decoded pixels are identified, where T is an integer equal to or greater than one. In step 740, the first currently decoded pixels starting from a first starting position are decoded by copying the first reference pixels starting from the first starting reference position respectively.

The flowchart shown is intended to illustrate an example of color index coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of color index map decoding using palette prediction modes for blocks in a picture, the method comprising:

receiving an input coded bitstream including compressed data of blocks in a picture;

parsing from the input coded bitstream a current coding mode for one or more first currently decoded pixels in a current block starting from a first starting position;

if the current coding mode corresponds to a generalized copy-previous-row mode:

identifying one or more first reference pixels starting from a first starting reference position located at T-th row above said one or more first currently decoded pixels, wherein T is an integer equal to or greater than one; and decoding said one or more first currently decoded pixels starting from the first starting position by copying said one or more first reference pixels starting from the first starting reference position respectively.

2. The method of claim 1, further comprising:

parsing from the input coded bitstream offset value indicating to a distance between the first starting position and the first starting reference position.

3. The method of claim 2, wherein the offset value is binarized using unary codes, wherein a shortest codeword is assigned to a smallest offset value and a longest codeword is assigned to a largest offset value.

4. The method of claim 2, wherein the offset value is binarized using fixed-length codes.

5. The method of claim 4, wherein the offset value is restricted to be equal to or smaller than K, wherein K is a positive integer larger than two.

6. The method of claim 2, wherein the offset value is binarized using truncated binary codes, wherein a shorter codeword is assigned to a smaller offset value and a longer codeword is assigned to a larger offset value.

7. The method of claim 2, wherein the offset value is binarized using Exponential Golomb codes, Golomb Rice codes, truncated Exponential Golomb codes, truncated Golomb Rice codes, or n-bits truncated unary plus Exponential Golomb codes.

8. The method of claim 2, wherein the offset value is binarized to form a binarized offset value and the binarized offset value is coded using context-based coding or bypass mode.

9. The method of claim 8, wherein if the offset value is binarized using unary codes, the binarized offset value is coded using up to (N+H−1)-bins context-based coding, wherein N corresponds a first number of reference pixel rows immediately above the current block that are used for predicting the current block, H correspond to block height or block width of the current block.

10. The method of claim 8, wherein a first part of the binarized offset value is coded using the context-based coding and a second part of the binarized offset value is coded using the bypass mode.

11. The method of claim 8, wherein if the offset value is binarized using fixed-length codes, the binarized offset value is coded using K-bins context-based coding, wherein K corresponds to a number of bins of the fixed-length codes.

12. The method of claim 11, wherein K is equal to two when a maximum offset value is equal to four.

13. The method of claim 1, wherein N reference pixel rows immediately above the current block are included for predicting the current block.

14. The method of claim 1, wherein said one or more first reference pixels involve N unavailable rows of reference pixels immediately above the current block, said N unavailable rows of reference pixels are set to a pre-defined value.

15. The method of claim 1, wherein said one or more first reference pixels involve two unavailable rows of reference pixels immediately above the current block, an offset value indicating to a distance between the first starting position and the first starting reference position is not signaled for the first starting position in row 0 and row 1 of the current block.

16. The method of claim 15, wherein the offset value is inferred to be −2 for the row 0 and the offset value is inferred to be −1 for the row 1.

17. The method of claim 1, wherein said one or more first reference pixels involve two unavailable rows of reference pixels immediately above the current block, a one-bit codeword is signaled for an offset value indicating to a distance between the first starting position and the first starting reference position.

18. The method of claim 17, wherein said one-bit codeword indicates whether the first starting reference position is in a first row immediately above the current block or in a second row at two rows above the current block.

19. The method of claim 1, further comprising:

if the current coding mode corresponds to a copy-left mode or escape mode:

identifying a second reference pixel; and decoding one or more second currently decoded pixels starting from a second starting position by copying the second reference pixel.

20. The method of claim 1, further comprising:

parsing from the input coded bitstream a first run value indicating to a total number of said one or more first reference pixels.

21. The method of claim 20, wherein a maximum value for the first run value is fixed by a block size of the current block and the first run value is binarized depending on the block size of the current block.

22. The method of claim 21, wherein the first run value is binarized into a codeword consisting of a prefix part depending on the block size of the current block and a suffix part.

23. The method of claim 22, wherein for the current block equal to 8×8, ranges of the run value, corresponding prefix part and corresponding suffix part are (0-0, "0", 0 bit), (1-1, "10", 0 bit), (2-3, "110", 1 bit), (4-7, "1110", 2 bits), (8-15, "11110", 3 bits), (16-31, "111110", 4 bits) and (32-63, "111111", 5 bits).

24. The method of claim 22, wherein for the current block equal to 16×16, ranges of the run value, corresponding prefix part and corresponding suffix part are (0-0, "0", 0 bit), (1-1, "10", 0 bit), (2-3, "110", 1 bit), (4-7, "1110", 2 bits), (8-15, "11110", 3 bits), (16-31, "111110", 4 bits) (32-63, "1111110", 5 bits), (64-127, "11111110", 6 bits) and (128-255, "11111111", 7 bits).

25. A method of color index map coding using palette prediction modes for blocks in a picture, the method comprising:

receiving input data associated with a current block;

if one or more first currently coded pixels in the current block starting from a first starting position are predicted respectively by one or more first reference pixels starting from a first starting reference position located at T-th row above said one or more first currently coded pixels, wherein T is an integer equal to or greater than one:

selecting a first coding mode for said one or more first currently coded pixels; and signaling the first coding mode for said one or more first currently coded pixels.

26. The method of claim 25, further comprising:

if one or more second currently coded pixels in the current block starting from a second starting position are predicted by a second reference pixel:

selecting a second coding mode for said one or more second currently coded pixels; and signaling the second coding mode for said one or more second currently coded pixels.

\* \* \* \* \*